United States Patent

Norton et al.

[11] Patent Number: 6,154,662
[45] Date of Patent: Nov. 28, 2000

[54] PROVIDING VOICE DIALING SERVICE FOR WIRELESS ROAMERS

[75] Inventors: Michael Robert Norton, Naperville; Adam Stanislaw Pajerski, Hawthorn Woods; Hamid Reza Zarafshar, West Chicago, all of Ill.

[73] Assignee: Lucent Technologies Inc., Murray Hill, N.J.

[21] Appl. No.: 09/032,050

[22] Filed: Feb. 27, 1998

[51] Int. Cl.⁷ .................................................. H04Q 7/00
[52] U.S. Cl. .......................... 455/563; 455/79; 455/414; 379/88.03
[58] Field of Search .............................. 379/88.03, 88.01; 455/79, 67.7, 563, 433, 414, 445, 564, 116, 550

[56] References Cited

U.S. PATENT DOCUMENTS

| | | | |
|---|---|---|---|
| 4,961,212 | 10/1990 | Marui et al. ........................... | 379/88.03 |
| 5,042,063 | 8/1991 | Sakanishi et al. ..................... | 379/88.03 |
| 5,222,121 | 6/1993 | Shimada ................................. | 379/88.03 |
| 5,297,183 | 3/1994 | Bareis et al. ............................ | 455/410 |
| 5,301,227 | 4/1994 | Kamei et al. .......................... | 379/88.03 |
| 5,402,481 | 3/1995 | Waldman ................................. | 379/355 |
| 5,509,049 | 4/1996 | Peterson ................................... | 455/563 |
| 5,659,597 | 8/1997 | Bareis et al. ............................. | 455/563 |
| 5,703,940 | 12/1997 | Sattar et al. ............................ | 379/201 |
| 5,749,072 | 5/1998 | Mazurkiewicz et al. ............... | 704/275 |
| 5,758,281 | 5/1998 | Emery et al. ........................... | 455/428 |
| 5,761,433 | 6/1998 | Billings .................................... | 709/231 |
| 5,819,178 | 10/1998 | Cropper .................................. | 455/433 |
| 5,835,570 | 11/1998 | Wattenbarger ....................... | 379/88.03 |
| 5,842,139 | 11/1998 | Muramatsu et al. .................... | 455/563 |
| 5,905,774 | 5/1999 | Tatchell et al. ....................... | 379/88.04 |

Primary Examiner—Dwayne D. Bost
Assistant Examiner—Sonny Trinh
Attorney, Agent, or Firm—Werner Ulrich

[57] ABSTRACT

An arrangement for providing voice dialing service to wireless subscribers when they are not being served by their home mobile switch, and service node. When a voice dialing request from a roamer is detected, the voice dialing data file of the roamer is requested by a broadcast message from the home service node of the roamer. The home service node responds to the broadcast request by transmitting the voice dialing data file to the requesting service node. The requesting service node retains the voice dialing data file as long as there are sufficiently frequent requests (e.g., once per day), for voice dialing service from the roamer. Advantageously, this arrangement allows voice dialing service to be provided to roamers as well as to mobile stations in their home area.

4 Claims, 3 Drawing Sheets

PROVIDING VOICE DIALING SERVICE FOR WIRELESS ROAMERS

TECHNICAL FIELD

This invention relates to methods and apparatus for providing voice dialing service to wireless roamer stations problem.

Problem

Voice dialing is a desirable feature in any telecommunications context. With voice dialing, the customer speaks a word or phrase and speech recognition techniques are used to find the nearest pre-recorded word or phrase, matching the spoken word or phrase; a pre-stored telephone number is associated with each stored word or phrase; thus phrases like "Mother", "Boss", "Fred", and for more specialized applications, "Fire", "Police" or "City Hall" may each have an associated telephone number. When the caller speaks one of these phrases or words, the phrase or word is recognized using speech recognition techniques and the call is established to the desired destination.

With present day costs, it is desirable to use a centralized and therefore shared, speech recognition facility to make the translation between the spoken utterance and the desired telephone number. The speech recognition facility stores for each caller a set of pre-recorded words or phrases spoken by the caller, and the telephone number corresponding to each pre-recorded word or phrase. The pre-recorded words or phrases may be stored as encoded speech signals, or as a series of phohemes. Regardless of how this is done, a file of pre-recorded words and phrases, and the corresponding telephone numbers is stored for each caller subscribing to the service.

The service is particularly useful for wireless subscribers, especially those wireless subscribers who are in automobiles. Clearly, it is desirable that automobile bound users not have to take their eyes off the road in order to dial. The service is, therefore, especially attractive for such users.

Many, if not most, mobile wireless users subscribe temporarily or longer term basis, to roamer service wherein they are served by a switch other than the switch in which they are registered. The switch in which they are registered is the one that retains the word and phrase file in an associated service node. Service nodes are not necessarily provided on a one-to-one basis with switches; some switches may have multiple service nodes, while others may share a service node. The problem of the prior art is that there is no good economical way for providing voice dialing to roamers.

Solution

The above problem is solved, and an advance is made over the prior art in accordance with this invention wherein when a roamer speaks a voice dialing message, the service node serving that roamer broadcasts that roamer's identity to all other service nodes of a telecommunications network in order to obtain the voice dialing file from the service home service node of the caller. When that voice dialing file has been obtained, the service node serving the roamer uses the data in that file to identify the telephone number corresponding to the roaming caller's spoken word or phrase, and causes the switch associated with that roamer and that service node to complete the call. Advantageously, a roamer may roam any place in a telecommunications network, and still receive the voice dialing service.

In accordance with one feature of Applicants' invention, once the voice dialing file has been obtained for roamer, it is retained in the data base of the service node serving that roamer at that time until there has been a sufficiently long period when the voice dialing file for that roamer has not been accessed in that service node. Advantageously, such an arrangement minimizes the number of accesses of a remotely stored voice dialing data base of a customer, and reduces the number of times that the customer must wait while that data base is being accessed.

In one preferred embodiment, a wide area network is used to interconnect the service nodes. A request for the voice dialing data file for a caller identified by that caller's mobile identification number (MIN), is broadcast to all service nodes. Only the home service node for that mobile identification number responds with the voice dialing file for that mobile. Advantageously, a wide area network which has the capability for supporting many other services has the fast response time and bandwidth necessary for transporting the relatively large amount of data required to a voice dialing data file in a short time.

DETAILED DESCRIPTION

Figure 1:
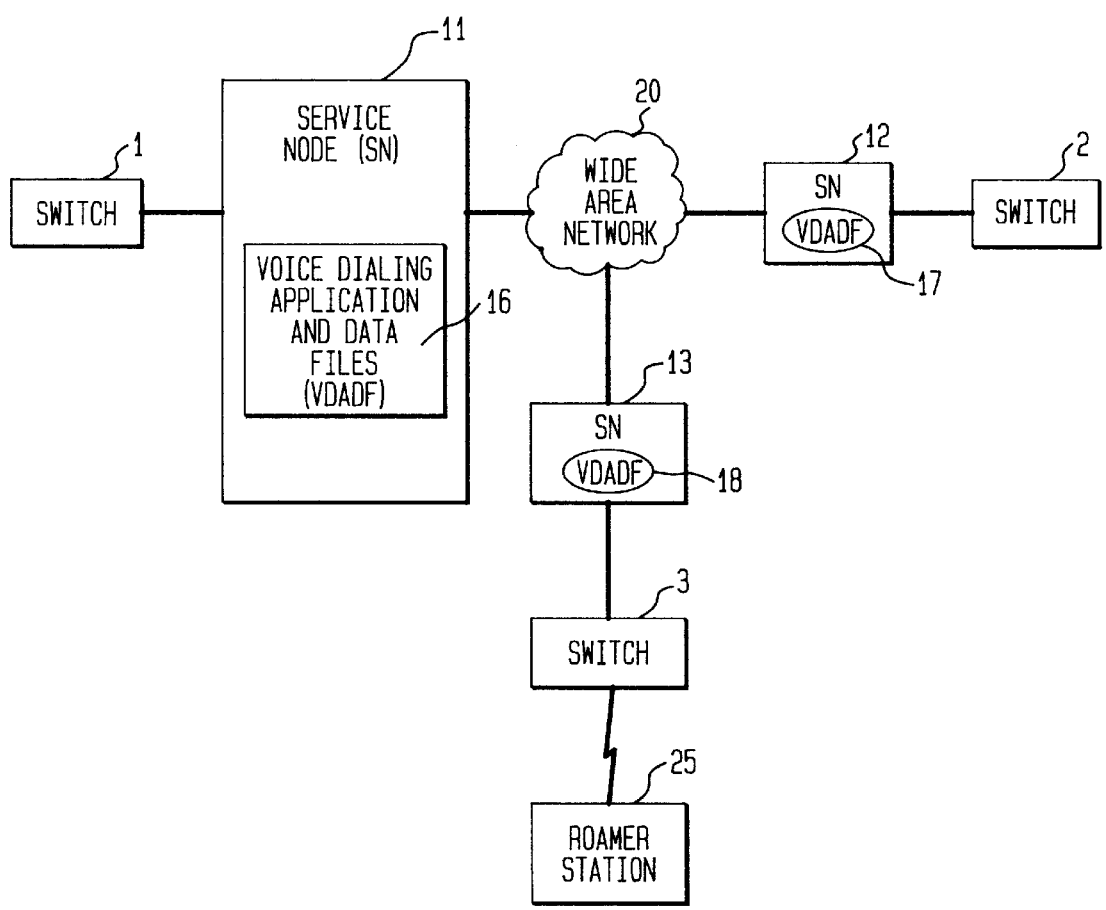
FIG. 1 is a block diagram showing the overall operation of Applicants' invention.

FIG. 1 illustrates the operation of Applicants' invention. Shown are three mobile switches; switches 1, 2, and 3, each with an associated service node, respectively, service nodes 11, 12, and 13. Each service node has a voice dialing application and data files (VDADF), 16, 17, and 18 respectively. A roamer station 25, whose home switch is switch 1, and whose home service node for the voice dialing application is service node 11, is currently being served by switch 3. When roamer station 25 elects to place a voice dialed call, switch 3 makes a request of service node 13 to provide the telephone number corresponding to the roamer's spoken word or phrase. To identify the roamer's station, switch 3 provides to service node 13 the mobile identification number (MIN), received from the roamer station. Service node 13 looks in its own permanent and temporary voice dialing data files to see if there is a voice dialing data file for the roamer station. Service node 13, and the other service nodes have both permanent, i.e., home voice dialing data files, and temporary, i.e., roamer voice dialing data files. If service node 13 finds the voice dialing data file for roamer station 25 in either of its voice dialing data files (since roamer station 25 is not a home station for service node 13, the voice data dialing file for roamer station 25 would only be in the temporary voice dialing data files of service node 13), to see if the voice dialing data file for roamer station 25 is in its data files. If so, then the call is processed conventionally using the speech recognition capabilities of service node 13, and the voice dialing data file for roamer station 25, (identified by its MIN). If the voice dialing data file for roamer station 25 cannot be found in service node 13, service node 13 broadcasts a message over wide area network 20 requesting the voice dialing data file for roamer station 25, identified by its MIN. The broadcast is sent to all the service nodes of the network and will be sent to service node 11, among others. Service node 11, which is the home service node for roamer station 25, contains the voice dialing data file for roamer station 25, and therefore, service node 11 would respond to the broadcast request by sending the voice dialing data file for roamer station 25 to service node 13. Note that if, for example, service node 12 had the voice dialing data file for roamer station 25 in its temporary data files, then service node 12 would not respond to the request; only home service nodes which have a voice dialing data file in their permanent files respond to broadcast requests. The request is broadcast over a wide area network 20 interconnecting all the service nodes. A wide area network has the advantage of being able to send a large amount of data in a short time, thus minimizing the delay in setting up the voice dialed call. Wide area network 20 can be used for many other applications. In Applicants' preferred embodiment, the wide area network (WAN) is a general purpose WAN which can also be used for network monitoring and management applications.

Figure 2:
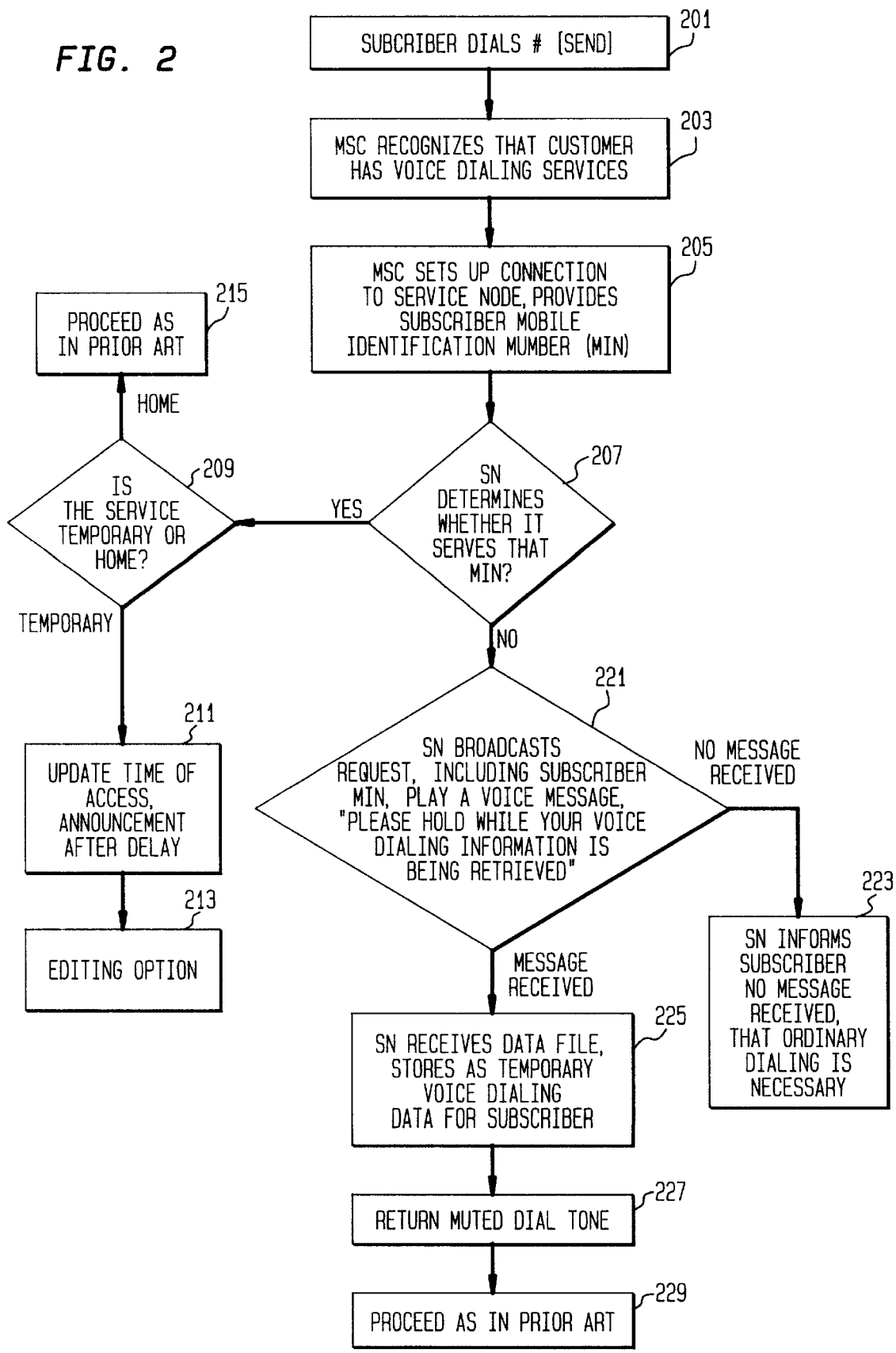
FIG. 2 is a flow diagram illustrating the processing of a roamer requested voice dialing call.

FIG. 2 is a flow diagram illustrating the processing of a call by a roamer. In order to trigger the voice dialing application, the customer must dial one character, such as sharp, and push the send button, (Action Block 201). The connected mobile switching center (one of the switches illustrated in FIG. 1), recognizes that the customer has requested voice dialing service, (Action Block 203). The mobile switching center sets up a connection to a service node for providing voice dialing service, and provides the subscriber mobile identification number (MIN), to the service node (SN), Action Block 205). The service node determines whether or not it has a voice dialing data file for that MIN, (Test 207). If the SN has such a data file, then Test 209 is used to determine whether the data file is temporary or permanent. If temporary, then the time of access for that data file is updated, (Action Block 211 for subsequent use as described with respect to Test 401 of FIG. 4). The SN also arranges to block the caller from editing his/her voice dialing data files since the voice dialing data file should probably only be edited at and by the home service node. If a decision is made by a particular operating company that editing the voice dialing data file is allowed, then following an editing, the edited version must be transmitted to the home service node, which should always have an up-to-date voice dialing data file in case the roamer moves, (Action Block 213).

If the result of Test 209 indicates that the mobile caller is being served by its home service node, then call processing proceeds as in the prior art, (Action Block 215).

If the service node determines that it does not have the voice dialing data file for the caller, then the service node broadcasts a request, (including the caller's MIN, to all other service nodes over the wide area network, and plays a voice message such as "please hold while your voice dialing information is being retrieved". If no message is received in response to the broadcast, then the service node informs the caller that ordinary dialing is necessary (Action Block 223), and the call proceeds using conventional dialing. If the service node receives a response to its broadcast request, then the service nodes receives a voice dialing data file which it stores as a temporary voice dialing data file for the subscriber identified by the MIN, (Action Block 225). Muted dial tone is then returned to the caller so that the caller can speak the appropriate word or phrase for identifying the called number, (Action Block 227). Subsequently, the call is processed as in the prior art, (Action Block 229). If the caller does not speak in response to the muted dial tone, an announcement is returned after a delay to remind the caller.

Figure 3:
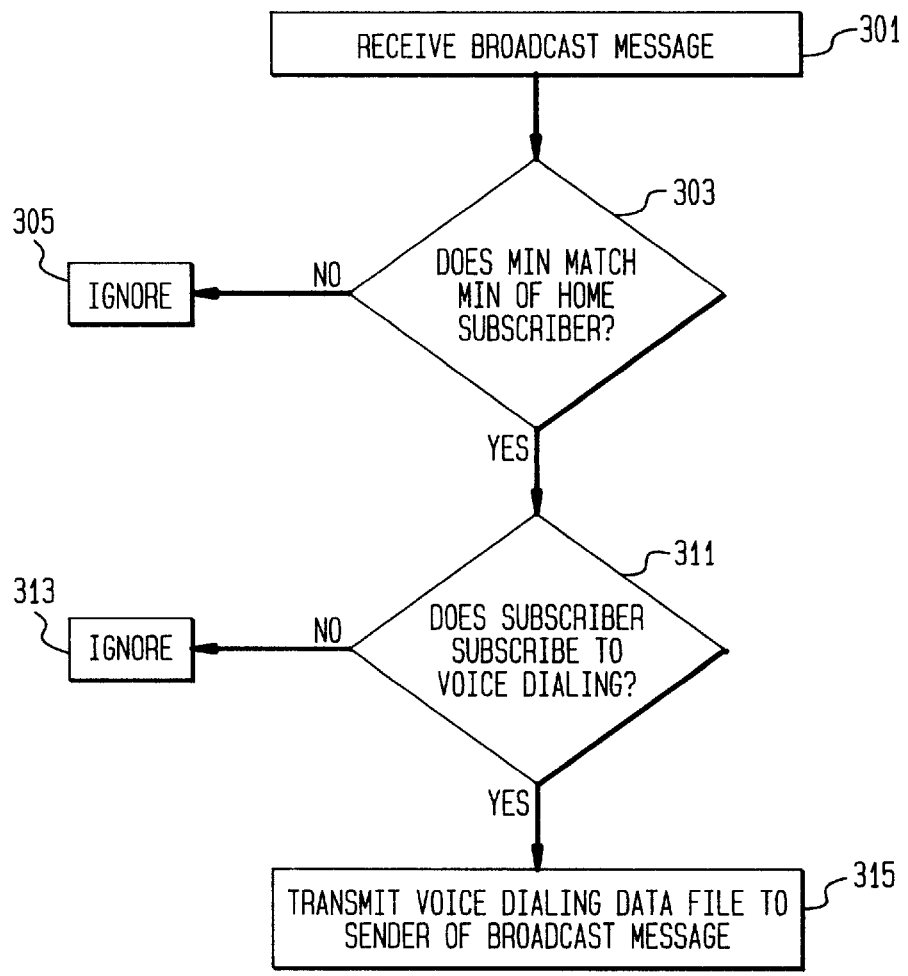
FIG. 3 illustrates the process of broadcasting a request for a voice dialing data file.

FIG. 3 illustrates the process of responding to a broadcast message. A service nodes receives the broadcast message, (Action Block 301). The service node checks whether the MIN of the broadcast message matches the MIN of a home subscriber served by that service node, (Action Block 303). If not, the broadcast message is ignored (Action Block 305). If the MIN does match the MIN of a home subscriber served by the service node, then the service node tests whether the subscriber subscribes to voice dialing (Test 311). If not, the message is ignored, (Action Block 313). If so, the service node transmits the voice dialing data file to the sender of the broadcast message, (Action Block 315). The sender of the broadcast message, a service node now serving the caller having the identified MIN, can then use that data file to process a call, using voice dialing.

Figure 4:
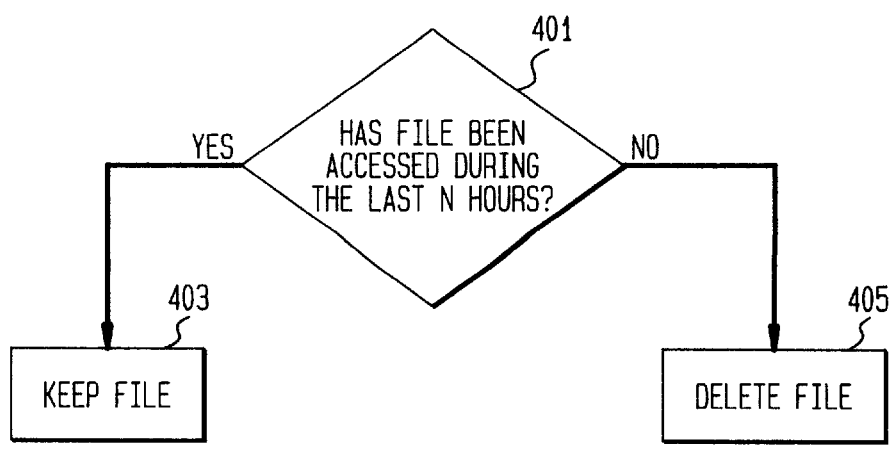
FIG. 4 illustrates the process of purging old temporary voice dialing data files in a service node.

FIG. 4 illustrates the process of purging temporary files in a service node. Test 401 determines whether the file has been accessed during the last "n" hours, (the most recent accessing time has been updated using Action Block 211 of FIG. 2). Typically, "n" might be 24 hours. If the file has not been accessed during that period, then the file is deleted, (Action Block 405). If the file has been accessed during that period, then the file is kept until the next purging interval (Action Block 403). Purging may be done, for example, once a day during a period of light load, (for example, 3 a.m.).

Many variations of the arrangements described above will be apparent to those of ordinary skill in the art without departing from the scope of Applicants' invention. Applicants' invention is only limited by the attached Claims.

What is claimed is:

1. In a telecommunications network, a method of providing voice dialing service to wireless roamers comprising the steps of:

detecting a call comprising a voice dialing service request;

determining whether a service node serving said call has voice dialing data for a calling station of said call;

if said service node has said voice dialing data, completing said call using said voice dialing data;

if said service node does not have said voice dialing data, broadcasting a request for said voice dialing data to other service nodes of a telecommunications network;

if another service node has a voice dialing data file for said calling station, responding to said broadcast request by transmitting said voice dialing data over a wideband wide area network to said serving service node; and using the transmitted voice dialing data file to identify a telephone number corresponding to a word or phrase spoken by said caller completing said call.

2. The method of claim 1, wherein the step of responding to said broadcast request comprises the step of responding only from a home service node of said caller station.

3. The method of claim 1, wherein said caller's station is identified by a mobile identification number, and wherein said request comprises said mobile identification number.

4. The method of claim 1, wherein said wideband wide area network is a net-work shared with other applications.

* * * * *